Oct. 1, 1940.  A. R. MASSEY  2,216,277
BOX
Filed Nov. 1, 1937  3 Sheets-Sheet 1
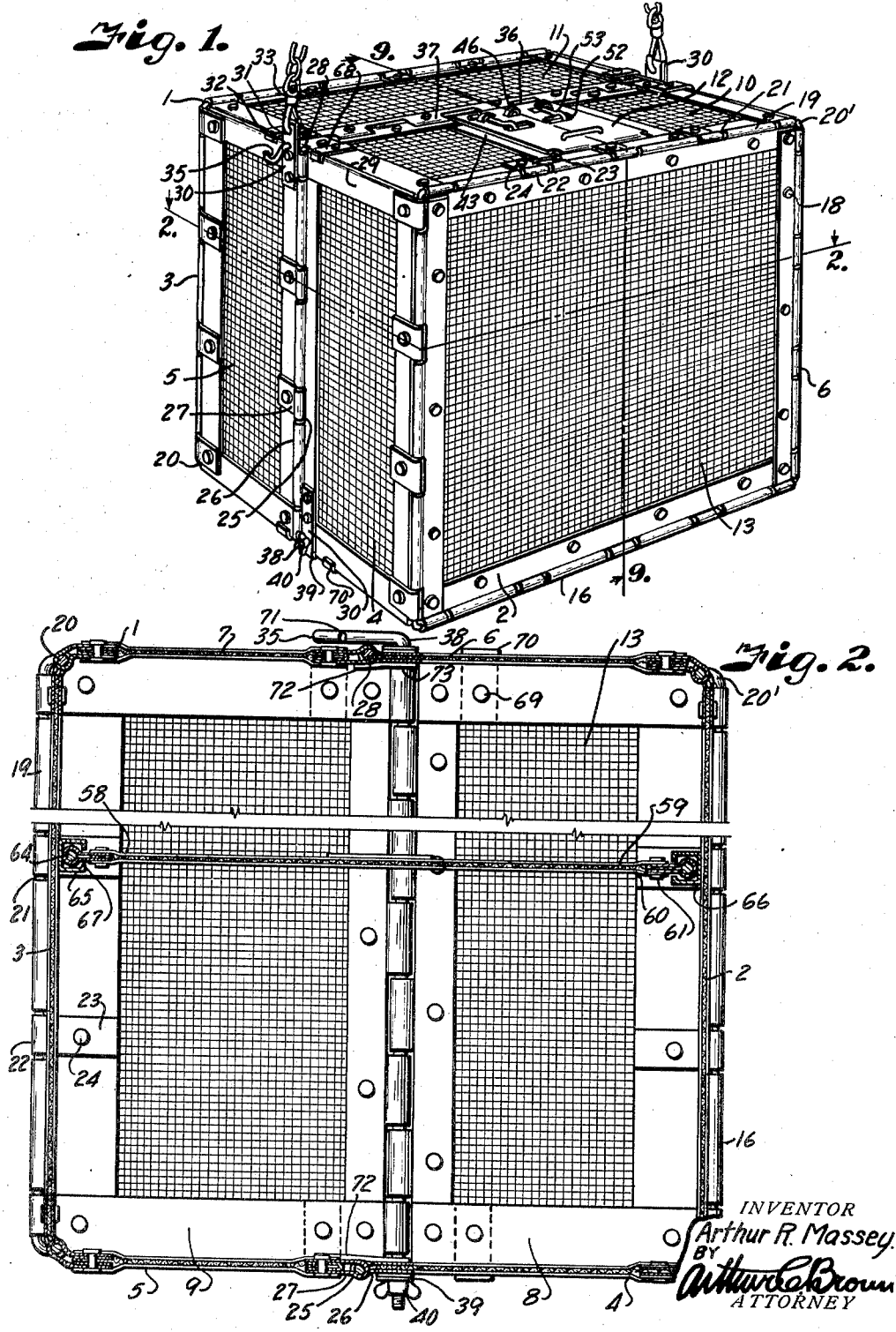
INVENTOR
Arthur R. Massey
BY
Arthur E. Brown
ATTORNEY Oct. 1, 1940.  A. R. MASSEY  2,216,277
BOX
Filed Nov. 1, 1937  3 Sheets-Sheet 2
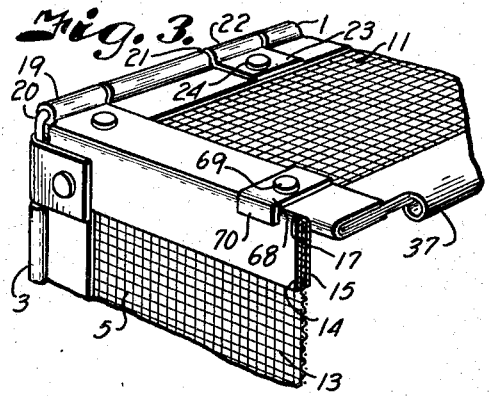
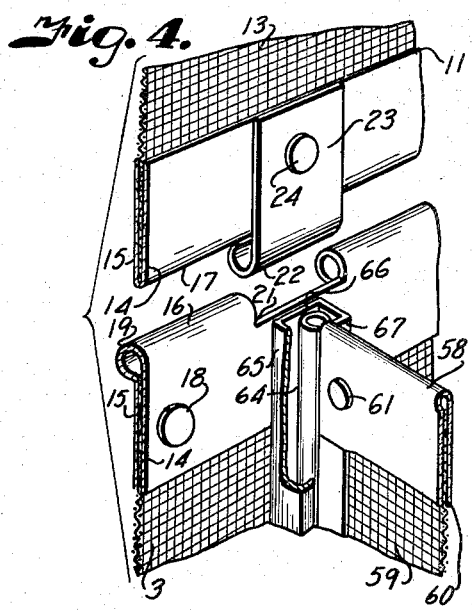
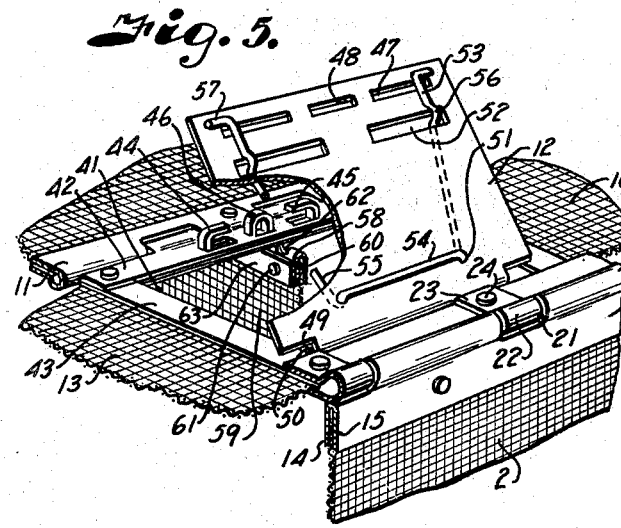
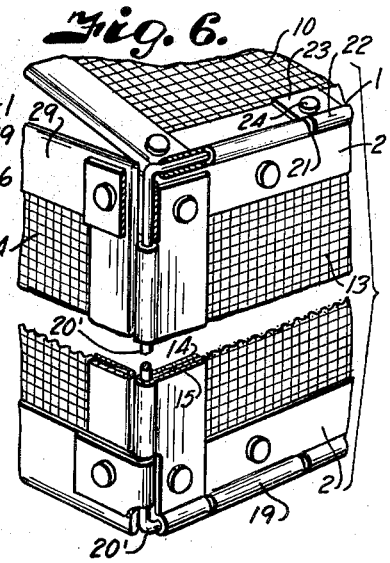
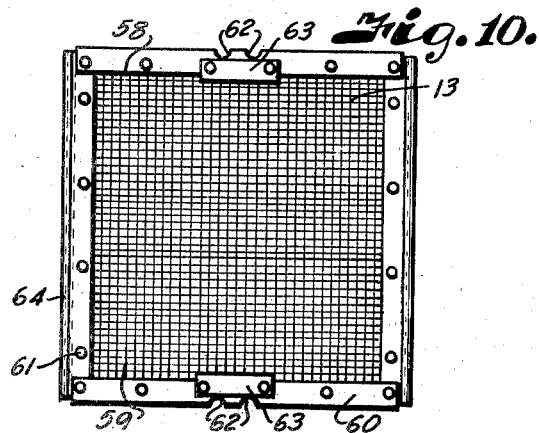
INVENTOR
Arthur R. Massey.
BY
Arthur C. Brown
ATTORNEY Oct. 1, 1940.         A. R. MASSEY         2,216,277
BOX
Filed Nov. 1, 1937         3 Sheets-Sheet 3
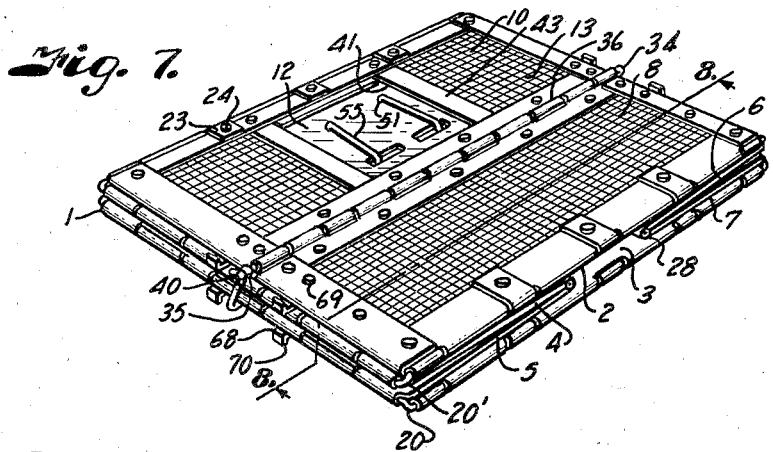
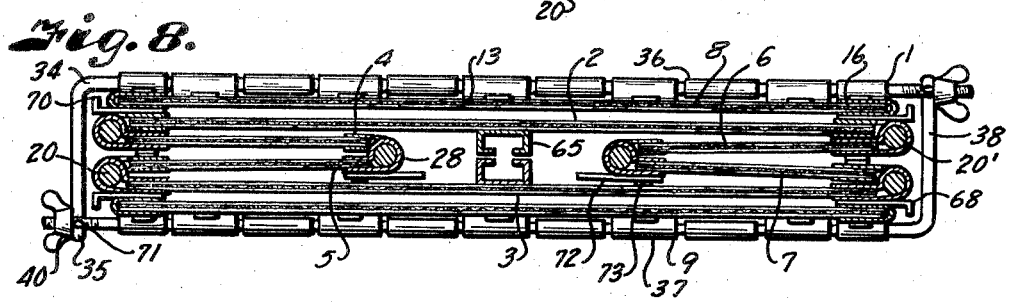
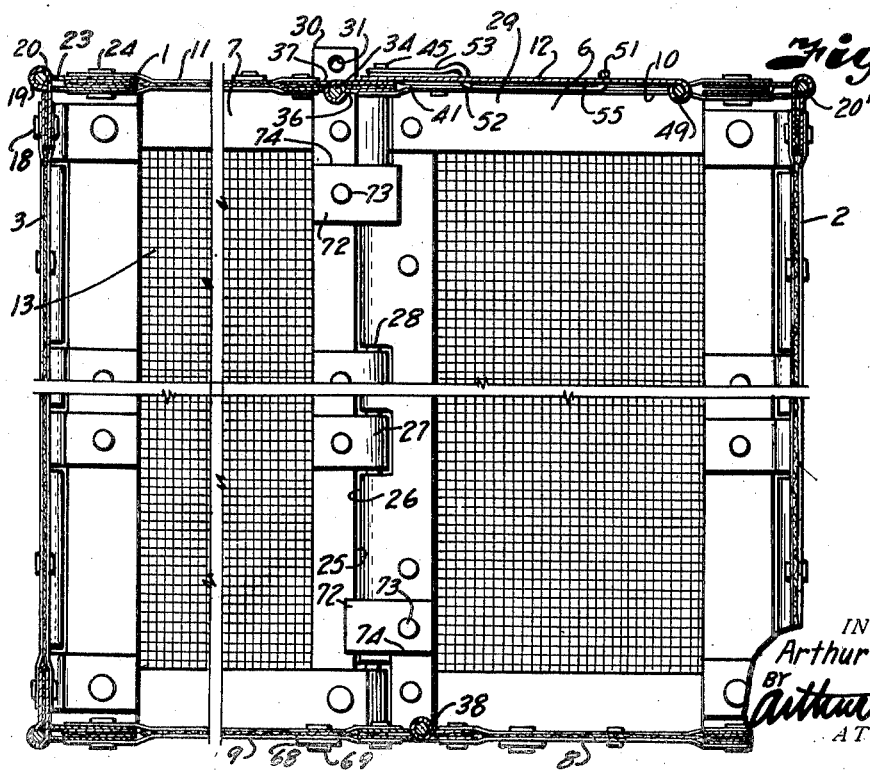
INVENTOR
Arthur R. Massey.
BY Arthur C. Brown
ATTORNEY Patented Oct. 1, 1940

2,216,277

UNITED STATES PATENT OFFICE 2,216,277

BOX

Arthur R. Massey, Kansas City, Mo.

Application November 1, 1937, Serial No. 172,208

7 Claims. (Cl. 220—6)

This invention relates to boxes and more particularly to collapsible boxes adapted to contain live objects, such as frogs, fish, fowl, dogs and the like.

The principal object of the present invention is to provide a box for live objects, which is of rigid construction in either erected or collapsed condition.

Other important objects of the present invention are to provide a collapsible box of perforate structure in order to provide ventilation for objects contained in the box; to provide a box of this nature wherein objects contained in the box are visible; to provide for quickly and efficiently collapsing the box; to provide retaining members capable of use in maintaining the box either in collapsed or erected condition; to provide for selectively segregating objects contained in the box; to provide for ready access to the interior of the box, yet normally maintaining the same in closed condition; to render the joints of the box more durable; and to enhance the utility of boxes of this nature in general.

In accomplishing these and other objects of the present invention, I have provided improved details of structure, the preferred form of which is illustrated in the accompanying drawings wherein:

Fig. 1 is a perspective view of a box embodying the features of the present invention.

Fig. 2 is a horizontal section on the line 2—2, Fig. 1, particularly illustrating the jointed structure of the box.

Fig. 3 is a detail perspective view of a corner of the box particularly illustrating a locking member, or lug, for aligning the connecting rod holes in the top and bottom sections relative to the holes in the bosses of the end sections.

Fig. 4 is a detail perspective view of a side of the box from the interior thereof illustrating the manner of mounting a partition in the box and showing the construction of the hinge members.

Fig. 5 is a detail perspective view of the box opening cover member, the cover member being shown in raised condition.

Fig. 6 is a detail perspective view of a pair of aligned corners at one end of the box, particularly illustrating the continuous wire for imparting rigidity to the sides and the manner of joining the top, end and bottom members thereto.

Fig. 7 is a perspective view of the box in collapsed condition.

Fig. 8 is a longitudinal cross section through the collapsed box on the line 8—8, Fig. 7, particularly illustrating the manner of maintaining the box in collapsed condition.

Fig. 9 is a vertical transverse section through the box on the line 9—9, Fig. 1.

Fig. 10 is a side elevation of the partition for the interior of the box.

Fig. 11 is a transverse section through one of the connecting rods, particularly illustrating the beveled hook portion thereof.

Referring more in detail to the drawings:

1 designates a collapsible box embodying the features of the present invention and which is adapted to contain live objects, said box including relatively collapsible side members 2 and 3, sectional end members 4—5 and 6—7, a sectional bottom member 8—9, and a sectional top member 10—11, a cover member 12 preferably being provided on one of the sections of the top member.

The respective members composing the box are preferably formed of a perforate material 13 in the form of wire mesh or screen, the edges of which are mounted between the flanges 14 and 15 of mold or trim members 16 and 17, which, as shown in Fig. 4, for example, comprise strips of bent or folded sheet metal, and later are more fully described.

The mold members 16 of the side members 2 and 3 preferably have their flanges fixed together, as by riveting or the like 18, to retain the screen in fixed condition, and the bent outer edges 19 thereof are formed in a hollow bead or loop to form a passageway therethrough, in such a manner that a bar 20, Fig. 3, may be extended through the passageways. Spaced notches are provided in the strips 19 at the bent sides thereof for receiving the socket ends 22 of anchoring members 23 fixed, as by rivets 24 or the like, in spaced relation along the length of the strip members 17 of adjacent sections of the box, which are preferably formed of bent sheet metal strips, it being apparent that the bar 20 is extendible through the bead 19 and socket 22, as shown in Fig. 4, of the side 3 of the box and the section 11 of the top member for hinging that section of the top member to the side member. Similar beaded strips bound the edges of each of the side members, and similar socket or anchoring members are mounted on adjacent sections in corresponding position relative to the notches in the strips of the side members in such a manner as to permit the rod 20 to be extended therethrough for hingedly connecting the edges of the side member 3 to adjacent sections of the end, top and bottom members 5, 7, 9, and 11, respectively. A similar bar 20', Fig. 6, is extendible through the loops and anchors of the side, end, top and bottom members 2, 4, 6, 8, and 10, respectively to hinge those sections together.

As particularly shown in Fig. 6, the beads and anchors of box sections are positioned adjacent the corners of the box and close to the edges of the sections, and that certain of the anchors are notched at the corners thereof to permit hinging of the sections. Such a structure binds the extremities of the corners together and thus prevents bending of the sections outwardly and thus avoids possible loss of objects contained in the box.

It is apparent that the corners of the box, formed in this manner, are rigid and durable and require little or no attention for the reason that a pair of bars 20 and 20' may be used to connect all the members and the corners of the bars are substantially flush with the corners of the box, thereby serving as a brace for the corners of the box. The corners of the bars 20 and 20' are, further, preferably offset, as shown, to provide for a more complete swinging action of the box sections relative to each other.

The adjacent edges 25 and 26 of the sectional end members are secured together in a manner similar to that of securing the opposite side edges thereof to the side members, that is, hollow beads or loops are provided on one of the edges, for example, the edge 26 of the section 4, and anchoring sockets 27 are provided on the other edge 25 of the section 5 to provide cooperating passageways for rods 28 having the body portions thereof extended through the cooperating beads and anchors, and the ends of the rods are suitably engaged in beads on the upper trim members 29, Fig. 1, of the end sections having the edge 26, for example, the sections 4 and 6. The corners of the rods 28 are also preferably offset to facilitate swinging of the end sections relative to each other and to space the end sections when folded to prevent deformation thereof.

One of each pair of the end sections is provided with upwardly extending bosses 30, which are suitably fixed to the side trim members 25 thereof, and which are provided with spaced apertures 31 and 32 for respectively receiving a box suspending apparatus 33 and a rod member 34 having a hook 35 at one end thereof. The body of the rod is of a size adapting it to be extended through the hollow beads 36 and 37 on the top sections 10 and 11 respectively for connecting the side edges of the top sections and closing the top of the box.

The top sections are shown to be of unequal width for adapting the connection thereof to be made at one side of the median line of the box.

The bottom sections are of correspondingly unequal width with the shorter and longer sections diagonally disposed relative to a cross sectional plane vertically through the box. In this manner, a rod 38, similar to the rod 34, may be extended through cooperating hollow bead and anchor members on a side of the median line of the box opposite that of the rod 34, the ends of the rod 38 being mounted in bosses 39 fixed to the inner trim members of the end sections 4 and 6.

It is thus apparent that any stress placed on the box through connection of the top and bottom sections with the end sections, is distributed between the end wings or sections to provide a more balanced construction.

In connecting the side edges of the top and bottom sections with the rods 34 and 38, the hooks 35 form a stop for one end of the rods to prevent their extension beyond the bosses 30 and 39. The opposite ends of the rods are preferably provided with threaded ends and wing nuts 40 which bear against the bosses 30 and 39 for maintaining the end sections in engagement with the top and bottom section.

While the top and bottom sections are shown to be of unequal width, the total width of the sections adjacent the side edges of a side member 10 is equal to the width of that side member in order that, when the box is collapsed, the top and bottom sections may be folded outwardly and against the outer face of the side members for interengagement with each other at the anchor and beaded portions of the trim members thereof and a connection made with the rods 34 and 38 in a manner similar to their normal closed condition.

An opening 41, Fig. 5, is provided in the box preferably on one of the top sections to permit the insertion or extraction of objects relative to the box when in erected condition. Such an opening is constructed by providing the same with trim members of the top section in which the opening is provided. The trim member 42 on the inside edge of the apertured top section is provided with lugs 44 preferably spaced equidistantly from the end edges of the aperture, which lugs are provided with inturned hook flanges 45. A loop 46 is also provided on the trim member 42 preferably spaced equally between the lugs 44.

The lugs and loop member are engageable in apertures 47 and 48, respectively, which are formed adjacent the side edge of a cover member 12 for the box aperture. The outer side edge of the cover member 12 is preferably provided with a loop for receiving a hinge pin 49 or the like therein, the hinge pin 49 having the ends thereof mounted in the trim members 43 which bound the box opening, as shown at 50 in Fig. 5.

The cover member is further provided with spaced apertures 51 which are spaced from the apertures 47 and the cover member is further provided with spaced slots 52 for respectively receiving the outer ends 53 of a locking member 54, which is preferably in the form of a bent tensionable rod having the bent midportion thereof engaging on the outer surface of the cover member preferably adjacent the hinge portion thereof and the outer ends 53 thereof extend upwardly through the slots 52, the ends being thereafter bent to form finger portions 56 for compressing the ends of the locking member to permit engagement thereof under the flanges 45 of the lugs 44, the ends of the locking member being retained in engagement with the lugs by laterally turned ends 57 of the locking member. When the cover is in closed condition, the loop 46 engages in the aperture 48 in such a manner that a suitable lock may be applied thereto for locking the cover in box closing condition.

It is sometimes desirable to segregate objects within the box, and I therefore make a provision for such a segregation by providing a partition 58, Fig. 10, which is preferably formed of perforate material such as wire mesh 59, the edges of which are mounted in bent sheet metal trim members 60 for clamping the wire mesh between the flanges thereof. Fastening devices such as rivets 61 are provided for securing the trim members together and retaining the same in mesh engaging and retaining condition. A pair of opposite trim members are provided, preferably in equidistantly spaced relation to the ends thereof, with spaced notches 62, which are spaced from each other a distance equal to the difference in width of the top and bottom sections in such a manner that when the partition is mounted in the box, either of the rods 34 or 38 may be received in either of the notches 62. It is thus apparent that either end of the partition may be positioned adjacent either the top or bottom sections of the box.

Reinforcing members 63 are mounted on the end trim members of the partition adjacent the notches 62 for additionally supporting the trim members and the rods relative to the partition when the partition is mounted in the box.

The side trim members of the partition are provided with beaded edges 64, which are engageable within guide members 65, Fig. 4, mounted on the side members 2 and 3 of the box, the guide members having body portions 66 fixed to the side members and outwardly and inwardly turned spaced flanges 67 spaced from each other a distance less than the width of the bead, but more than the thickness of the trim members in such a manner that the partition may be slid into and out of the guide members for positioning the partition in upright relation to the bottom of the box.

Locking hook members 68, Fig. 3, may also be provided on certain of the sections of the box, which are preferably in the form of angle clips having one of the ends thereof fixed to the trim members of the sections as by rivets 67, and having the angularly extending flange 70 thereof engageable over the outer surface of the adjacent trim member on an adjacent section to prevent collapse of the box, and particularly bending of the end sections outwardly relative to the interior of the box.

The outer ends of the hooks 35 of the section connecting rods 34 and 38 are also provided with beveled edges 71, Fig. 11, for a purpose which will become apparent from a description of the operation of the invention.

Further, the interior faces of the end sections are preferably provided with stop members 72, Fig. 9, fixed in a suitable manner as by fastening devices such as rivets 73, to the adjacent edges of said sections and to the lower ends of the bosses 30 at the outer ends thereof. The secured inner ends of the stop members 72 preferably have their top and/or bottom edges flush with the inside ends of the bosses 30, as shown at 74, to prevent pivoting of the stop members on their rivets. The stop members are also adapted to overlie opposite adjacent end sections and engage therewith for preventing collapse of the end sections outwardly when the top and bottom members are open.

The operation and manner of use of a collapsible box constructed as described is as follows:

Assuming first that the box is in erected condition, as shown in Fig. 1, and that it is desired to collapse the box for shipping or storage purposes; the suspending apparatus 33 is removed in a suitable manner from the bosses 30 on the box. The wing nuts 40 on the threaded ends of the connecting rods are removed and the bars withdrawn from the passages formed by the cooperating hollow bead and anchor members of the adjacent top and bottom sections. The top and bottom sections are then folded outwardly on their hinges at the edges of the side members and, while they are shown as of unequal width, the total width thereof being equal to the width of the side member, the hollow beaded trim members and socket members of the trim members of directly opposite sections are interengageable in such a manner that the rods are insertable through the passages thereof to maintain the sections in outwardly folded condition.

The end sections are then forced inwardly on their hinge members 27 and the sides are therefore brought together and into contact with the inner faces of the end sections.

The connecting rods 37 and 38 having been mounted in oppositely disposed relation in the passages formed by the top and bottom section loops, that is, with the hook members of the rods at opposite ends of the box, the hook members may be turned, as shown in Fig. 7, to a position adjacent the ends of the rods, further movement in that direction forcing the beveled edges 71 of the rods over the ends of the rods and the extreme outer ends of the hook members latching the hooks to the rods.

Since the box is preferably formed of sheet metal and wire mesh construction, it has an inherent resiliency, and, after being latched by the rods, tends to expand for maintaining the hooks and rods in firm engagement and rigidly maintaining the box in collapsed condition.

The wing nuts 40 are then mounted on the threaded ends of the rods for retaining the hooked ends of the rods against lateral displacement from engagement with the threaded ends of the rods.

The box may then be transported or stored in a suitable manner.

When it is again desired to use the box, the wing nuts are removed from the threaded ends of the rods. The box is compressed to release the hooks of the rods from engagement with the opposite ends thereof, and the side members are moved outwardly relative to each other for distending the end sections of the box.

The box is then in the form of a pen and is self-supporting in such a manner that the rods may be withdrawn from engagement in the passages formed by the adjacent trim members of top and bottom sections and such top and bottom sections may then be folded inwardly relative to the side members for interengagement with adjacent and cooperable top and bottom sections, respectively, the hook members 68 engaging over adjacent trim members of adjacent sections for preventing collapse of the box. The rods 34 and 38 are then extended through the passages formed by adjacent trim member loops on the top and bottom sections, the rods being extended therethrough in oppositely disposed relation, and the hooks on the rods limiting insertion thereof relative to the passages in the box. The wing nuts are then applied to the threaded ends of the rods and the box is in rigidly erected condition.

When it is desired to place objects in the box, the finger portions 56 of the resilient latch bar 54 are compressed for releasing the ends thereof from engagement with the lugs on the trim member of the top section and the cover member is hinged outwardly relative to said section. Objects may then be either inserted in the box or extracted therefrom at will, whereupon the cover may be closed and the finger portions of the resilient rod released for engagement of the ends of the rod with the lugs of the top section for latching the cover member in box closing condition.

When it is desired to segregate objects within the box, the partition 58 is placed therein prior to closing or connecting the top sections of the box, this operation being effected by positioning the partition in such a manner that the notched ends form the top and bottom edges thereof and sliding the beaded trim members 64 into the guide members 65.

It is apparent that with the partition mounted in the box and with the cover member positioned on the top section, as shown, the opening overlies both portions of the partitioned box so that insertion or extraction of objects from either end of the box is possible. It is further apparent, however, that a plurality of openings may be provided in the box, and a similar number of cover members, to provide an opening for each portion or compartment of the partitioned box.

The principal advantages in a box constructed according to my invention over other boxes of the same general character heretofore available are that objects in the box are plainly visible and ventilation is provided for the comfort of objects in the box. The box is readily collapsible and is of rigid character when either in erected or collapsed condition, and a further advantage is apparent in the fact that the same bolts or bars are used for connecting the top and bottom sections of the box that are used for retaining the box in collapsed condition.

What I claim and desire to secure by Letters Patent is:

1. A box of the character described including side, end, top, and bottom members hingedly connected together, said end members being hinged longitudinally thereof intermediate the width thereof, said top and bottom members being formed in sections of unequal width, opposite pairs of said sections corresponding in total width to said side members, and means for removably securing said top and bottom sections together.

2. A box of the character described including side, end, top, and bottom members hingedly connected together, said end members being hinged longitudinally thereof intermediate the width thereof, said top and bottom members being formed in sections of unequal width, opposite pairs of said sections corresponding in total width to said side members, and means for removably securing said top and bottom sections together, each of said sections being foldable outwardly upon one of said side members and being adapted to interengage with each other.

3. A perforate box including side, end, top, and bottom members hingedly connected together, said end members being hinged longitudinally thereof intermediate the width thereof, said top and bottom members being formed in sections of unequal width, opposite pairs of said sections corresponding in total width to said side members, means for removably securing said sections together, each of said sections being foldable outwardly upon one of said side members and being adapted to interengage with each other, and a partition removably mounted in said box for segregating objects contained therein.

4. A box of the character described including side, end, top, and bottom members composed of mesh material having the ends thereof mounted in strips of sheet material, said sheet material having spaced cooperating loops along the edges thereof, means engageable in said loops for hingedly mounting adjacent edges of said members together, said end members having a pair of sections hingedly connected together, said top and bottom members each having a pair of sections of unequal width, means connecting the edges of the sections of the top and bottom members, said means being removable from said sections for adapting the same to be hinged outwardly relative to the side members and to be interengaged with the corresponding section of the opposite member, said means for connecting the sections being engageable therewith when in folded condition and with each other for collapsing the box and maintaining the same in collapsed condition.

5. In combination with a box having relatively collapsible members, means for maintaining the box in collapsed condition including a pair of bars of a length greater than the collapsible members, said bars each having laterally extending hooks at one end thereof of a length approximately that of the thickness of said members when in collapsed condition, the respective hooks being engageable with the opposite ends of the respective bars for clamping the collapsed box therebetween.

6. A box of the character described including side, end, top, and bottom members composed of mesh material having the ends thereof mounted in strips of sheet material, said sheet material having spaced cooperating loops along the edges thereof, means engageable in said loops for hingedly mounting adjacent edges of said members together, said end members having a pair of sections hingedly connected together, said top and bottom members each having a pair of sections of unequal width, and means connecting the edges of the sections of the top and bottom members, said means being removable from said sections for adapting the same to be hinged outwardly relative to the side members and to be interengaged with the corresponding section of the opposite member.

7. A box of the character described including side, end, top, and bottom members hingedly connected together, said end members being hinged longitudinally thereof intermediate the width thereof, said top and bottom members being formed in sections of unequal width, opposite pairs of said sections corresponding in total width to said side members, means for removably securing said top and bottom sections together, and means on said top and bottom sections engageable with said end members independently of said securing means for bracing, connecting and aligning said top and bottom members and the sections thereof relative to said end members and each other.

ARTHUR R. MASSEY.